Patented Oct. 13, 1925.

1,557,147

UNITED STATES PATENT OFFICE.

EDWARD S. FARROW, JR., OF ROCHESTER, NEW YORK, ASSIGNOR TO EASTMAN KODAK COMPANY, OF ROCHESTER, NEW YORK, A CORPORATION OF NEW YORK.

PROCESS OF TREATING CELLULOSE ACETATE.

No Drawing. Application filed January 20, 1925. Serial No. 3,681.

*To all whom it may concern:*

Be it known that I, EDWARD S. FARROW, Jr., a citizen of the United States of America, residing at Rochester, in the county of Monroe and State of New York, have invented certain new and useful Improvements in Processes of Treating Cellulose Acetate, of which the following is a full, clear, and exact specification.

This invention relates to a process of treating cellulose acetate in such a way as to change the solubility thereof. One object of the invention is to provide a process in which chloroform-soluble cellulose acetate is quickly, reliably and inexpensively hydrolyzed to the desired degree, say to acetone solubility for instance. Another object of the invention is to provide a process in which the conversion of chloroform-soluble cellulose acetate to acetone-soluble cellulose acetate can be so carried out that the quality of the final acetate will be uniform in successive batches. Still another object of the invention is to provide a process for obtaining acetone-soluble cellulose acetate from chloroform-soluble cellulose acetate without impairing the former and without lessening the desired qualities, such as flexibility, of products like film, into which it enters. Other objects will hereinafter appear.

I have discovered that chloroform-soluble cellulose acetate may be changed, so as to be soluble in different organic solvents by dissolving it in strong phosphoric acid, either ortho or pyro, and maintaining the solution at a moderate temperature until the desired result is obtained. I prefer to use chloroform-soluble cellulose acetate, which is in a form having a large surface relative to its mass, such as powder or thin film. This enables me to dissolve every particle of the material quickly, in order to obtain uniform action. The time of dissolving is greatly lessened. I have found that the solution of cellulose acetate in strong phosphoric acid, and the partial hydrolysis of the material which takes place while the solution is being kept, occur readily, even when some of the acetic acid and condensing agent from the original acetylating reaction mass are present.

If the chloroform-soluble cellulose acetate is initially in a solid and comparatively coarse form, I prefer to mechanically subdivide it, as by cutting, grinding, crushing and the like; or it may be dissolved in chloroform or other suitable solvents and made into thin films or fibers by any of the usual processes. It is also convenient to use an initially fibrous form of chloroform-soluble cellulose acetate, such as that for instance disclosed in U. S. patent to Mork, No. 854,374, May 21, 1907.

For the sake of simplicity and low cost, in the preferred form of my invention I utilize chloroform-soluble cellulose acetate which is directly derived from the original reaction mass in a form having a large surface. This may be readily done in accordance with the methods disclosed in U. S. Patents No. 1,494,830, Cook, May 20, 1924, process of manufacturing cellulose acetate, No. 1,494,816, Seel, May 20, 1924, process of manufacturing cellulose acetate, and No. 1,516,225, Webb, Nov. 18, 1924, process of manufacturing cellulose acetate. In all of these patents the surface of the reaction mixture is greatly increased relative to its mass and most of the acetic values such as acetic acid, are conducted away in the form of vapor and recovered.

Taking by way of illustration a powder produced in the Seel process or the Webb process, I prefer to dissolve it in concentrated ortho phosphoric acid of a strength ranging from 60% up to the strength which will just remain liquid at room temperature. A syrupy form of ortho phosphoric acid aqueous solution containing from 70 to 85% of the pure acid has been found to be especially useful. The powder is merely dissolved in the acid, using agitation or rapid stirring to make the action uniform, although it dissolves very quickly in the concentrated syrupy acid, even without agitation. The action takes place even when the chloroform-soluble cellulose acetate in the comminuted material or powder contains some residual acetic acid and some condensing agent.

As soon as the solvent capacity of the particular strength of acid employed is used up, the addition of powder is stopped and the solution allowed to stand until the desired degree of hydrolyzation, evidenced by the production of acetone solubility, is effected. With a syrupy solution containing from 70 to 85% of ortho phosphoric acid I may dissolve therein one-quarter of its own weight of comminuted cellulose acetate. This is a convenient proportion, although considerably more may be usefully dissolved therein.

The completion of the action can be readily detected by taking a small sample, precipitating the cellulose acetate by means of water and thoroughly washing it. The residue is then treated with the desired test solvent, usually acetone. When the sample indicates that the reaction has proceeded to the desired stage, the solution is treated with enough water to precipitate the cellulose acetate, the latter then being washed and dried. The phosphoric acid may then, if desired, be recovered by any suitable process.

The temperature used during the treatment may be varied over a considerable range, the change in solubility being effected more quickly as higher temperatures are employed. With ortho phosphoric acid in the syrupy form (70 to 85% for example) a useful range is between 50° F. and 80° F. The time during which the conversion can be effected will vary and is best established by a test as hereinabove described.

While I prefer to employ ortho phosphoric acid, the closely related pyro phosphoric acid is usable, these being the varieties of phosphoric acid which are liquids above their melting points, in contradistinction to meta phosphoric acid which sublimes.

Having thus described my invention, what I claim as new and desire to secure by Letters Patent is:

1. The process which comprises dissolving chloroform-soluble cellulose acetate in a solution of phosphoric acid of a type which is liquid above its melting point and partially hydrolyzing it while so dissolved.

2. The process which comprises treating chloroform-soluble cellulose acetate with ortho phosphoric acid of at least 60% strength until acetone-soluble cellulose acetate is produced.

3. The process which comprises dissolving chloroform-soluble cellulose acetate in syrupy ortho phosphoric acid of 70 to 85% strength and maintaining the solution until acetone-soluble cellulose acetate is produced.

4. The process which comprises dissolving chloroform-soluble cellulose acetate in a form having great surface relative to its mass in a solution of a type of phosphoric acid which is liquid above its melting point to dissolve it and partially hydrolyze it while it is so dissolved.

5. The process which comprises dissolving chloroform-soluble cellulose acetate containing acetic acid and a condensing agent in a solution of a type of phosphoric acid which is a liquid above its melting point and maintaining the solution until acetone-soluble cellulose acetate is produced.

6. The process which comprises dissolving powdered chloroform-soluble cellulose acetate in syrupy ortho phosphoric acid of 70 to 85% strength and maintaining such solution until acetone-soluble cellulose acetate is produced.

7. The process which comprises dissolving chloroform-soluble cellulose acetate in comminuted form in a concentrated solution of a type of phosphoric acid which is liquid above its melting point, the concentration of the acid being at least 60%, maintaining the solution until acetone-soluble cellulose acetate is produced, precipitating the acid from said solution and purifying it.

8. The process which comprises dissolving a reaction mass containing chloroform-soluble cellulose acetate in a form having a large surface relative to its mass and from which at least part of the acetic values have been removed in a solution of ortho phosphoric acid of greater than 60% strength, maintaining the solution until acetone-soluble cellulose acetate is produced, and finally precipitating and washing said cellulose acetate.

9. The process which comprises dissolving chloroform-soluble cellulose acetate in concentrated phosphoric acid of a type which is a liquid above its melting point, the concentration being above 60% and maintaining said solution at a temperature between 50° F. and 80° F. until acetone-soluble cellulose acetate is produced.

10. The process which comprises dissolving in syrupy ortho phosphoric acid of 70 to 85% strength a reaction mixture in powdered form containing chloroform-soluble cellulose acetate and from which at least part of the acetic values have been removed, maintaining said solution at a temperature between 50° F. and 80° F. until acetone-soluble cellulose acetate is produced, and finally precipitating and washing said cellulose acetate.

Signed at Rochester, New York, this 8th day of January, 1925.

EDWARD S. FARROW, Jr.